US008739048B2

(12) United States Patent
Moudy et al.

(10) Patent No.: US 8,739,048 B2
(45) Date of Patent: May 27, 2014

(54) MODIFYING CONVERSATION WINDOWS

(75) Inventors: Brian Scott Moudy, Kenmore, WA (US); Aarthi Natarajan, Kirkland, WA (US); Geeven Singh, Bellevue, WA (US); Amy Wai-Yee Ip, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 12/200,356

(22) Filed: Aug. 28, 2008

(65) Prior Publication Data

US 2010/0058203 A1    Mar. 4, 2010

(51) Int. Cl.
*G06F 3/048* (2013.01)
*G06F 3/00* (2006.01)

(52) U.S. Cl.
USPC ............ 715/759; 715/758; 715/821; 715/859

(58) Field of Classification Search
USPC .................. 715/758, 759, 795, 842, 821, 859
See application file for complete search history.

(56) References Cited

U.S. PATENT DOCUMENTS

| 6,401,111 | B1 | 6/2002 | Dan et al. |
| 6,633,310 | B1 * | 10/2003 | Andrew et al. ............... 715/728 |
| 7,068,266 | B1 | 6/2006 | Ruelle |
| 7,218,943 | B2 | 5/2007 | Klassen et al. |
| 7,386,807 | B2 | 6/2008 | Cummins et al. |
| 2002/0026483 | A1 * | 2/2002 | Isaacs et al. .................. 709/206 |
| 2002/0130904 | A1 * | 9/2002 | Becker et al. ................. 345/753 |
| 2004/0041841 | A1 * | 3/2004 | LeMogne et al. ............. 345/777 |
| 2004/0172455 | A1 | 9/2004 | Green et al. |
| 2004/0230572 | A1 | 11/2004 | Omoigui |
| 2004/0268263 | A1 * | 12/2004 | Van Dok et al. .............. 715/733 |
| 2006/0026284 | A1 | 2/2006 | Nguyen |
| 2006/0031370 | A1 | 2/2006 | Lyle et al. |
| 2006/0036703 | A1 * | 2/2006 | Fulmer et al. ................. 709/207 |
| 2007/0192735 | A1 | 8/2007 | Lehto et al. |
| 2007/0271361 | A1 | 11/2007 | Abzarian et al. |
| 2007/0288580 | A1 * | 12/2007 | Kaminsky et al. ........... 709/206 |
| 2008/0034435 | A1 * | 2/2008 | Grabarnik et al. ............. 726/25 |
| 2008/0065997 | A1 | 3/2008 | Szeto et al. |

FOREIGN PATENT DOCUMENTS

| CN | 101071375 | 11/2007 |
| KR | 20060016677 | 2/2006 |

OTHER PUBLICATIONS

International Search Report and Written Opinion Received for PCT Application No. PCT/US2009/051782 mailed on Feb. 24, 2010, 11 pages.
Hellstrom, et al., "Presentation of Text Conversation in Realtime and En-Bloc Form Draft—Hellstrom—Textpreview—05", Jun. 23, 2008, pp. 18.

(Continued)

*Primary Examiner* — Andrea Long
(74) *Attorney, Agent, or Firm* — Bryan Webster; Andrew Sanders; Micky Minhas

(57) ABSTRACT

A system described herein includes a receiver component that receives an indication that a conversation window for a first messaging contact is desirably collapsed, wherein the conversation window for the first messaging contact corresponds to an instant messaging application that is executable on a computing device. The system can further include a window minimizer component that collapses the conversation window into a contacts window of the instant messaging application, wherein the contacts window depicts a graphical indication of at least the first contact, wherein the graphical indication is highlighted to indicate that a conversation exists with the first messaging contact.

20 Claims, 18 Drawing Sheets

(56) References Cited

OTHER PUBLICATIONS

"WinExtra", retrieved at<< http://www.winextra.com/2008/06/01/comment-fragmentation-isnt-the-bloggers-fault/ >>, Jun. 24, 2008, pp. 8.
"Conversation Window", retrieved at<< http://msdn.microsoft.com/en-us/library/cc540561.aspx >>, Jun. 24, 2008, pp. 4.
"Last Call Review for IETF Indication of Message Composition for Instant Messaging", retrieved at<< http://xml.coverpages.org/ni2004-06-15-a.html >>, Jun. 24, 2008, pp. 3.
Boone, "Virtual Reference", retrieved at<< http://www.librarylaws.org/taxonomy/term/13 >>, Oct. 31, 2007, pp. 12.
"Notice on the First Office Action," Application No. 200980134287.4, The State Intellectual Property Office of the People's Republic of China, Mailed Feb. 16, 2013, pp. 1-18.

\* cited by examiner

MODIFYING CONVERSATION WINDOWS

BACKGROUND

Instant messaging allows users that use a common instant messaging client to communicate with one another in real-time. For instance, a first user of an instant messaging application can transmit text to a second user of the instant messaging application in real-time, and the second user can respond to the first user. Thus, through use of an instant messaging application, the first and second user can hold a real-time conversation.

Technology pertaining to instant messaging applications has advanced rapidly, as communications between users is not limited solely to text. For instance, an instant messaging application may allow users to share files, including documents, video files, music files, etc. Furthermore, an instant messaging application may be configured to transmit real-time video images of participants to an instant messaging conversation. More particularly, a first user may execute an instant messaging application and may initiate a conversation with a second user. The first user may (before or after the conversation has been initiated) connect a webcam to a personal computer operated by the first user. Video images of the first user may be transferred in real-time such that the second user can view video images of the first user during an instant messaging session. Still further, some instant messaging applications can be configured to transmit voice signals between users in real-time, such that users of an instant messaging application may conduct a voice conversation therebetween. Thus, instant messaging applications can be robust communication tools that incorporate numerous communication functionalities.

Many instant messaging applications are generally downloadable by way of the Internet for installation on a client computer. A user of an instant messaging application can inform the instant messaging application of contacts that also use the instant messaging application (or a different instant messaging application that is configured to communicate with the aforementioned instant messaging application). Additionally or alternatively, the user of the instant messaging application can cause invitations to be delivered (e.g., by way of email) to contacts of the user that have not installed the instant messaging application.

The graphical user interface of the instant messaging application can present a list of contacts to a user thereof, and can further indicate which of the contacts is online and possibly display a corresponding status message that describes a current status of the contact (e.g., busy, available, away, . . . ). To initiate an instant messaging communication with a contact, the user can select the contact (e.g., double-click) which causes a conversation window to appear. The user may then initiate a communication by, for example, typing a textual message that is desired to be transmitted to the contact. Such message may be transmitted to an instant messaging server and then directed to the instant messaging client of the contact.

Instant messaging communications generally occur by way of conversation windows, wherein a conversation window typically includes a viewing window that displays received messages and sent messages and an entry field that facilitates entry of text or other suitable information. While the design of conventional conversation windows is efficient for messaging, such conversation windows can use a significant amount of screen real-estate.

SUMMARY

The following is a brief summary of subject matter that is described in greater detail herein. This summary is not intended to be limiting as to the scope of the claims.

Described herein are various technologies pertaining to conversation windows in instant messaging applications. In a first example, a conversation window can be collapsed into a contacts window to make more efficient use of screen real estate, including real estate on a task bar. For instance, a first user can use an instant messaging application to undertake a conversation with a first contact, wherein such conversation can be illustrated in a conversation window on a client device of the first user. The first user can provide an indication that minimizing the conversation window is desirable (e.g., by depressing a button on the conversation window). The conversation window can then be collapsed into a contacts window of the instant messaging application. For example, the contacts window can include a graphical indication that is representative of the first contact, such as an icon and/or text, and the conversation window can be collapsed into the graphical indication. If a new message is transmitted to the first user by the first contact, the graphical indication can be modified to indicate that the new message has been transmitted to the first user. If the first user selects the graphical indication, the conversation window can be re-presented to the first user, and the conversation window can include newly received messages as well as previously received messages to provide the first user with conversation context.

In another example, upon passage of a defined amount of time that a conversation window is open and not employed by the first user or in response to an action undertaken by the first user, a data entry portion of the conversation window can be visually removed from the conversation window (thereby saving screen real-estate). Further, a remaining portion of the conversation window can be rendered at least semi-transparently, such that the first user can view the conversation window as well as content that lies "beneath" the conversation window. Upon the first user mousing over the conversation window or otherwise selecting the conversation window, the entire conversation window (including the data entry portion) can be returned to a non-transparent state.

In still yet another example, a data entry portion can be detached from a conversation window and placed at any suitable position on a display screen. Furthermore, the detached conversation window can be used to enter conversation information to a plurality of different contacts. Accordingly, the first user can undertake multiple conversations without using a maximum amount of screen real-estate.

Other aspects will be appreciated upon reading and understanding the attached figures and description.

DETAILED DESCRIPTION

Figure 1:
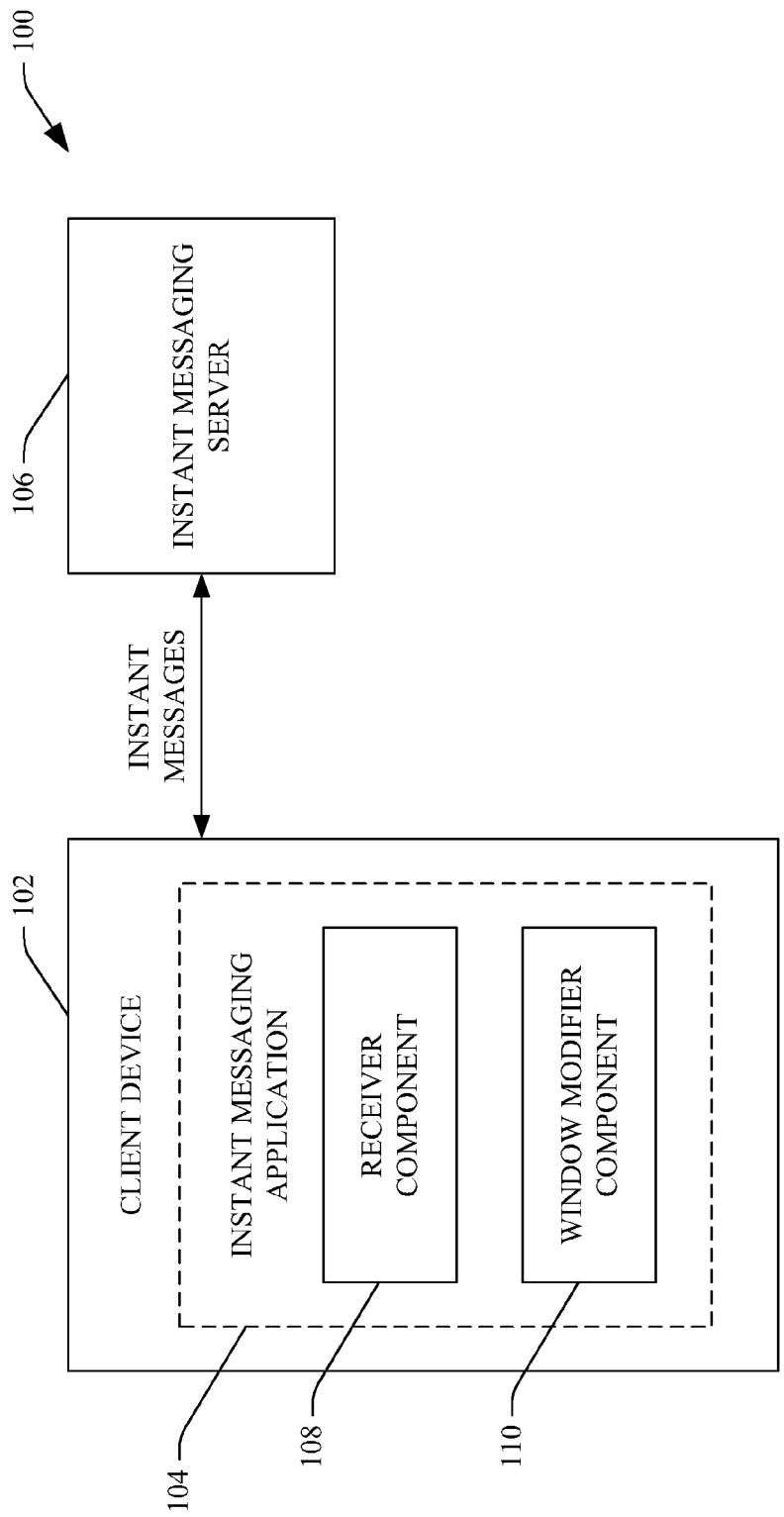
FIG. 1 is a functional block diagram of an example system that facilitates modifying a conversation window in an instant messaging application.

Various technologies pertaining to instant messaging in general, and conversation windows in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference now to FIG. 1, an example system 100 that facilitates rendering conversation windows in an instant messaging application to efficiently use display screen real estate is illustrated. The system 100 includes a client device 102, wherein the client device 102 can be a personal computer, a laptop computer, a personal digital assistant, a smart phone, or other suitable client device. While not shown, it is understood that the client device 102 includes at least a memory and a processor for executing instructions. An instant messaging application 104 can be installed on the client device 102, wherein the instant messaging application 104 can use any suitable instant messaging protocol to facilitate instant messaging.

In an example, the instant messaging application 104 can facilitate instant messaging by making available at least two different types of interfaces: 1) a main interface that includes a contacts window that illustrates contacts of a user of the instant messaging application; and 2) a conversation window that displays a conversation with a contact and provides an interface to transmit information to the contact. The contacts window can include one or more graphical indicia that represent contacts of a user that employs the instant messaging application 104. Contacts represented in the contacts window can be individuals and/or a persisted group of individuals. Upon user selection of a graphical indicator, for example, the instant messaging application 104 can cause a conversation window to be graphically rendered on a display screen, wherein the conversation window can be used to communicate by way of instant messaging with a contact represented by the graphical indicator.

An instant messaging server 106 can be configured to facilitate instant messaging between client devices. For example, the instant messaging server 106 can retain information related to instant messaging contacts for numerous users on the instant messaging server 106. Furthermore, the instant messaging server 106 can act as a router for instant messages transmitted by way of the instant messaging application 104. For instance, a first user using the instant messaging application 104 on the client device 102 can transit an instant message to a second user using the instant messaging application on a second client device by way of the instant messaging server 106.

The instant messaging application 104 can include a receiver component 108 that can be configured to receive various indications from the user of the instant messaging application 104 on the client device 102. In a first example, the receiver component 108 can receive an indication from the user that a conversation window for a first messaging contact is desirably collapsed. In another example, the receiver component 108 can receive an indication from the user that a data entry portion of a conversation window for a first messaging contact is desirably removed from view. In yet another example, the receiver component 108 can receive an indication from the user that a data entry portion of a conversation window for a first messaging contact is desirably detached from a remainder of the conversation window.

The instant messaging application 104 can also include a window modifier component 110 that can act to modify a conversation window in accordance with one or more indications received by the receiver component 108. For instance, as will be described in greater detail herein, the window modifier component 110 can collapse the conversation window into a contacts window pertaining to the instant messaging application 104. In another example, the window modifier component 110 can remove a data entry portion of a conversation window for a first messaging contact from view. In yet another example, the window modifier component 110 can cause a data entry portion of a conversation window to be detached from a remainder of the conversation window. Functionalities of the window modifier component 110 will be described in greater detail herein.

Figure 2:
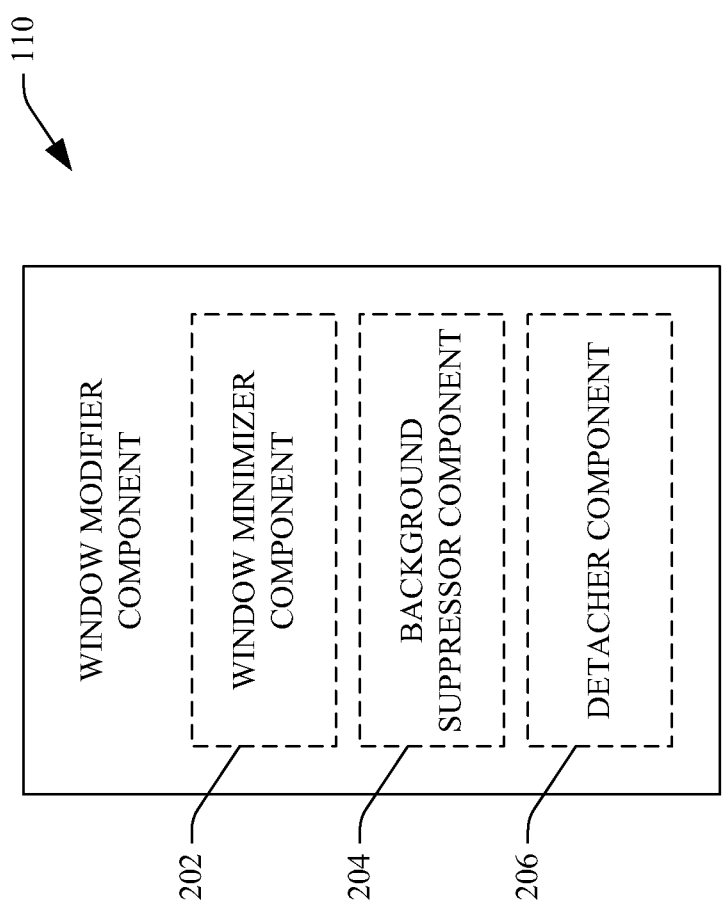
FIG. 2 is an example depiction of a component that facilitates modifying conversation windows in an instant messaging application.

Referring now to FIG. 2, an example depiction of the window modifier component 110 is illustrated. The window modifier component 110 can include a window minimizer component 202 that can cause a conversation window to be collapsed to a contacts window of a main interface of the instant messaging application 104 (FIG. 1). In an example, the receiver component 108 (FIG. 1) can receive an indication that a conversation window for a first messaging contact is desirably collapsed. The indication may be a user setting a messaging status to "busy", "unavailable", etc. In another example, the indication may be the user selecting a depressible button that causes the conversation window to be closed or minimized. The window minimizer component 202 can collapse the conversation window into a contacts window of the instant messaging application 104, wherein the contacts window can depict a graphical indication that is representative of at least the first contact.

Furthermore, the window minimizer component 202 can cause the graphical indication to act in a manner that indicates that a conversation exists with the first messaging contact. For instance, the graphical indication can be highlighted, can blink, or other suitable indication. In another example, the window minimizer component 202 can cause the graphical indication to act in a particular manner when a new message is received from the first contact while the conversation window is collapsed into the contacts window of the main interface. Moreover, the minimizer component 202 can cause messages in the collapsed conversation window to be maintained, such that when the conversation window is restored the user will be provided with context pertaining to the conversation (e.g., the user will be provided with visual information relating to current status of the conversation, including previously sent or received messages).

The window modifier component 110 can additionally include a background suppressor component 204 that can cause a data entry field of a conversation window to be visually removed from a display screen. Further, the background suppressor component 204 can cause at least a portion of the conversation window to be rendered in a semi-transparent manner. In an example, the background suppressor component can modify a conversation window as described above in response to receipt of a user command indicating desirability of modifying the conversation window or in response to passage of a particular amount of time that the conversation window has been unused. When the conversation window is moused over or otherwise selected by a user, the conversation window can be returned to an original state (e.g., to include the data entry field and to render the conversation window non-transparently).

The window modifier component 110 can additionally include a detacher component 206 that can cause a data entry field of a conversation window to be detached from a remainder of the conversation window. The window modifier component 110 can act as described in response to receiving an indication from a user (e.g., a click and drag) that the data entry field of the conversation window is desirably detached from the remainder of the conversation window. The detacher component 206 can also cause a single data entry field to be usable to communicate with other contacts via multiple conversation windows. In an example, the user may be communicating with multiple contacts by way of multiple conversation windows on the display screen of the client device 102 (FIG. 1). To save screen real estate, the user may wish to use a single data entry field to communicate with the multiple contacts. To indicate as much, the user may drag a first conversation window over a second conversation window, wherein a single data entry field can be used to communicate with multiple contacts in multiple conversation windows.

Figure 3:
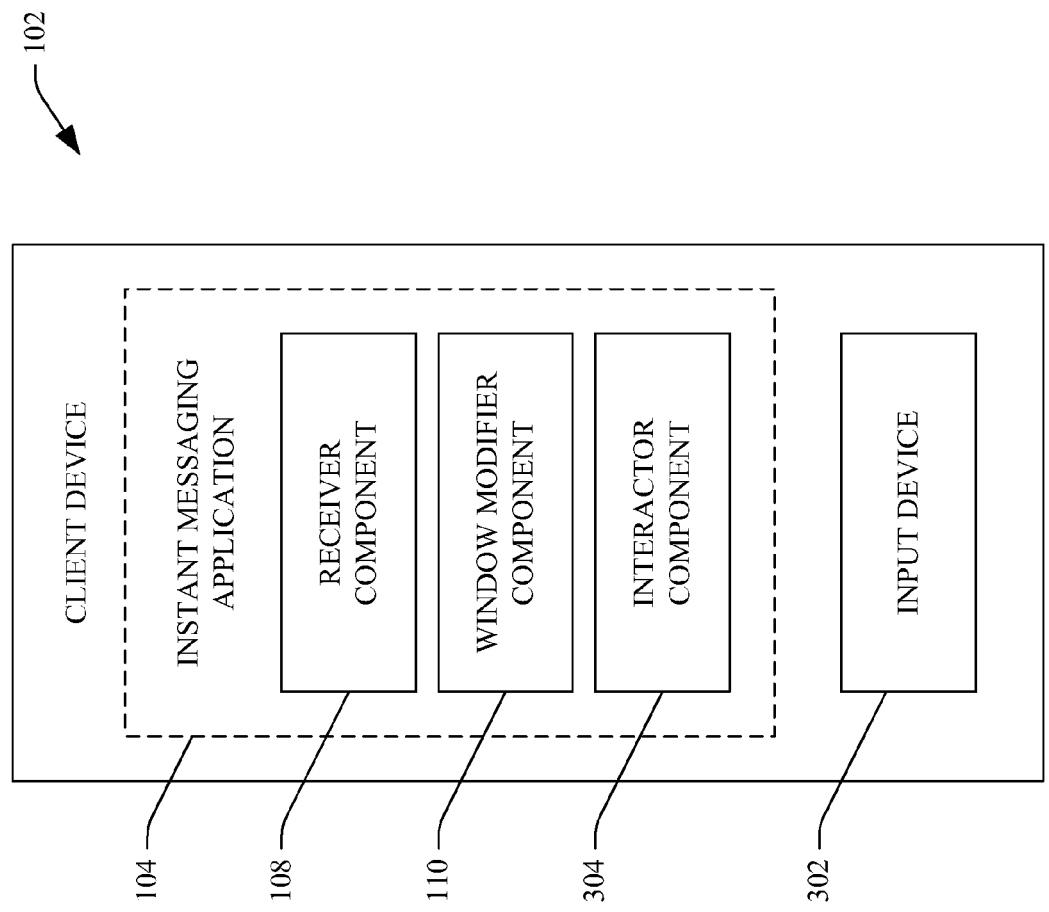
FIG. 3 is a functional block diagram of an example system that facilitates modifying a conversation window in an instant messaging application.

With reference now to FIG. 3, an example depiction of the client device 102 is illustrated. The system 300 includes client device 102, which is shown as including the instant messaging application 104. The instant messaging application 104 includes the receiver component 108 and the modifier component 110, which act in conjunction as described above. The client device 102 may also include an input device 302, which can be employed by a user to provide input to the client device 102. While shown as being included in the client device 102, it is to be understood that the input device 302 may be external to the client device 102. By way of example, the input device 302 may be a keyboard, a mouse, a stylus, a pressure-sensitive screen, a microphone adapted to receive voice input, or other suitable input device.

The client device 102 can additionally include an interactor component 304 that modifies a conversation window in response to input received from the input device 302. In an example, the indicator component 304 can operate in conjunction with the minimizer component 202 (FIG. 2). For instance, the interactor component 304 can receive user input from the input device 302 indicating selection of a graphical indicator in a contact window of a main interface of the instant messaging application 104. In this example, a conversation window can be collapsed into the contact window. Upon selection of the graphical indicator by the user, the interactor component 304 can cause the conversation window to be rendered on a display screen of the client device 102, wherein the conversation window can include messages transmitted from the messaging contact represented by the graphical indicator sent while the conversation window was collapsed into the contact window. Furthermore, the conversation window can display message history to provide the user with a conversation context.

In another example, the indicator component 304 can act in conjunction with the background suppressor component 204 (FIG. 2). For instance, the background suppressor component 204 can cause a conversation window to be displayed without a data entry field and/or semi-transparently on a display screen of the client device 102. The interactor component 304 can determine that the user has used the input device 302 to transition a mouse over the conversation window or otherwise select the conversation window. Upon determining that the conversation window has been moused over or otherwise selected, the interactor component 304 can cause the data entry field to be returned to the conversation window and/or the conversation window can be redrawn in a non-transparent state.

In yet another example, the indicator component 304 can act in conjunction with the detacher component 206 (FIG. 2). For instance, the detacher component 206 can be used to cause a data entry field to be displayed separately from a remainder of a conversation window. Furthermore, a display screen on the client device 102 may include multiple conversation windows. The interactor component 304 can receive an indication by way of the input device 302 that the user wishes to combine a first conversation window with a second conversation window, and the indicator component 304 can combine the first and second conversation windows. In an example, the user may use the input device 302 to select the first conversation window and drag it over the second conversation window. The indicator component 304 can also cause the detached data entry field to be employable to communicate by way of both conversation windows.

Figure 4:
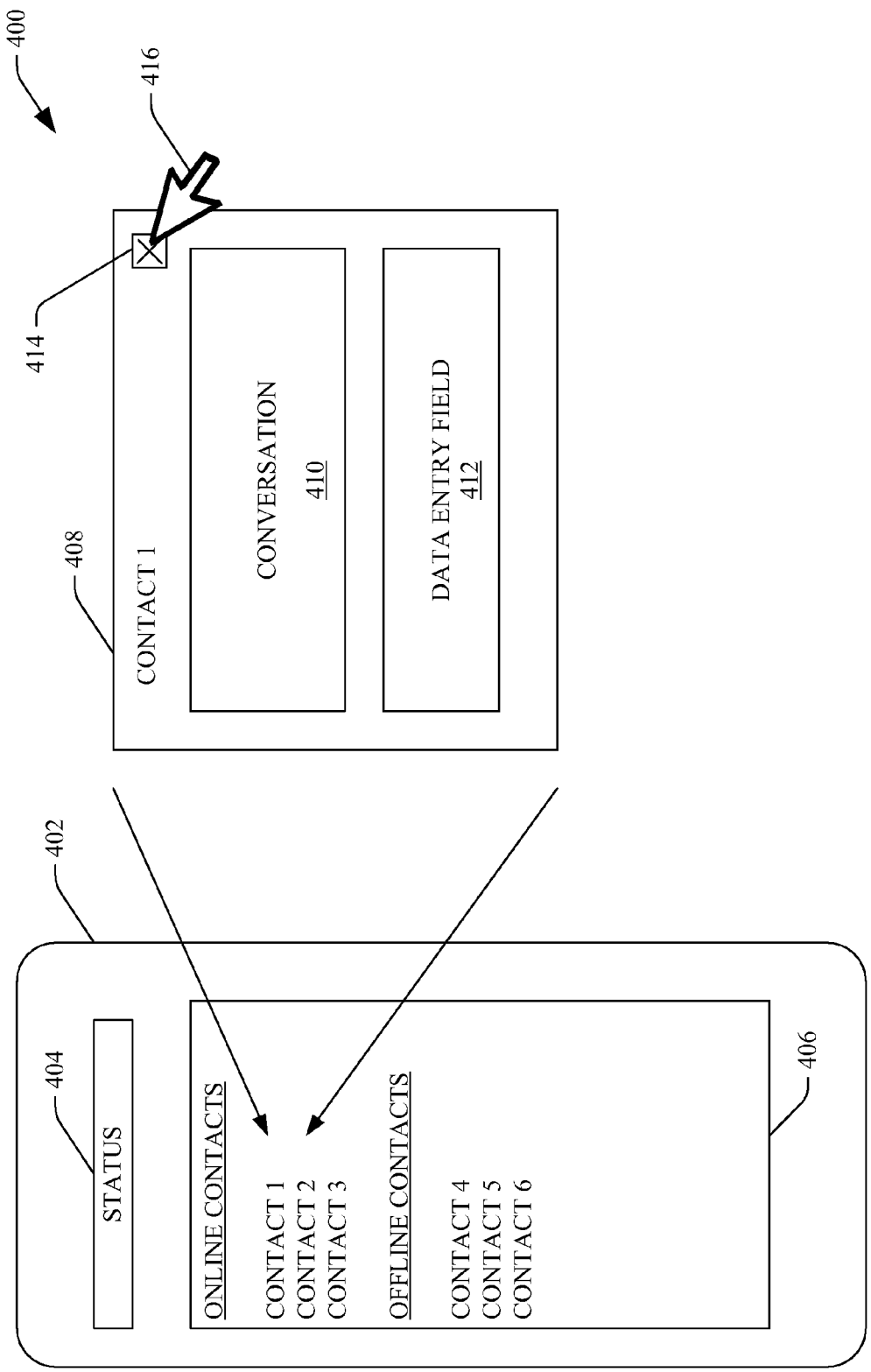
FIG. 4 is an example depiction of a main interface and a conversation window in an instant messaging application.

Now referring to FIG. 4, an example depiction 400 of a conversation window being collapsed into a contacts window of a main interface in an instant messaging application is illustrated. In this example, a main interface 402 includes a status bar 404 that can be employed by a user to set a messaging status of the user, such as "busy", "unavailable", or other suitable status. The main interface 402 also includes a contacts window 406, which can display contacts of the user and, optionally, status of contacts of the user. For instance, contact 1, contact 2, and contact 3 can be depicted as being online and available, and contact 4, contact 5, and contact 6 can be depicted as being offline and unavailable.

Upon receiving an instant message from one of the contacts and/or selecting a contact in the contacts window 406, a conversation window can be presented to the user to facilitate communication by way of instant messaging between the user and a particular contact. For instance, a conversation window 408 can be used by the user to converse by way of instant message with contact 1. The conversation window 408 can include a first portion 410 that depicts messages received from contact 1 as well as messages previously transmitted to contact 1. The conversation window 408 can also include a data entry field 412 that can be used by the user to enter information that is desirably transmitted to contact 1, including text, an image, a video, or other suitable information.

The conversation window 408 can also include a selectable button 414 that, when selected, indicates that the user wishes to cause the conversation window 408 to be collapsed into the contacts window 406 of the main interface 402. For instance, a cursor 416 can be used to select the button 414. Other manners for indicating that the user wishes to collapse the conversation window 408 into the contacts window 406 are also contemplated, including selecting a status on the status bar 404, minimizing the main interface 402, receiving voice commands, etc. When an indication is received that the conversation window 408 is desirably collapsed into the contacts window 406 of the main interface 402, such conversation window 408 can be collapsed, for instance, into an icon that is representative of the contact pertaining to the conversation (e.g., contact 1). The icon that is representative of the contact can be modified to indicate that a conversation is ongoing, such as rendering the icon in a particular color, causing the icon to blink, etc. Furthermore, if a message is received while the conversation window 408 is collapsed into the contacts window 406, the icon representative of the contact that is part of a conversation can alter to indicate receipt of a new message.

Figure 5:
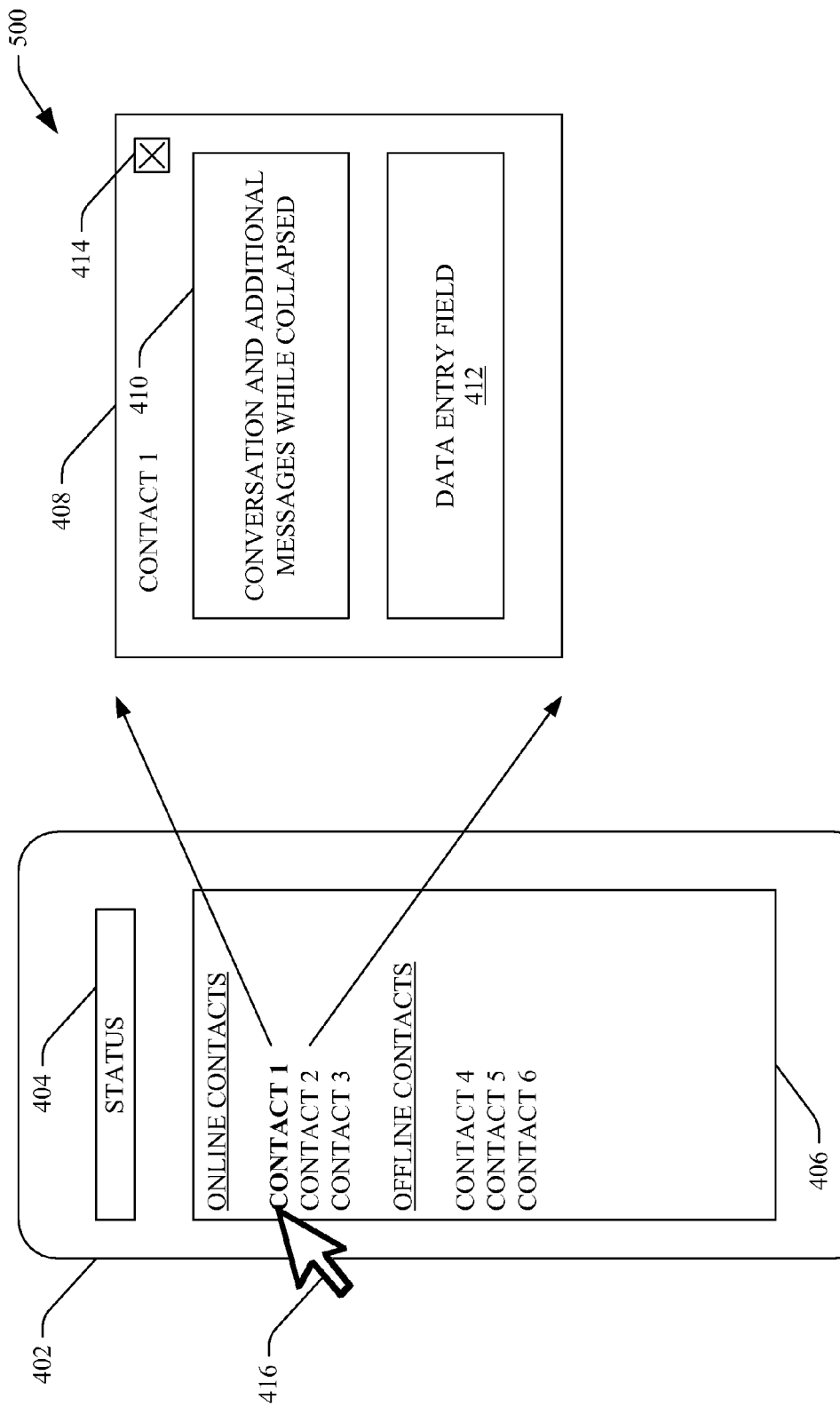
FIG. 5 is an example depiction of a main interface and a conversation window in an instant messaging application.

Turning now to FIG. 5, an example depiction 500 of a selection of an icon in the contacts window 406 that is associated with a collapsed conversation window is illustrated. In this example, the user has a current conversation with contact 1, and a conversation is collapsed into the contacts window 406 in general, and in particular into an icon representative of contact 1. The graphical icon representative of contact 1 can be graphically rendered to indicate that the user has a conversation with contact 1 and a conversation window is collapsed into the contacts window 406. The user can employ the cursor 416 to select the graphical icon that is representative of contact 1, which can cause the conversation window 408 to be visually presented to the user. The first portion 410 of the conversation window 408 can include previous messages as well as additional messages sent from contact 1 while the conversation window 408 was collapsed into the contacts window 406.

Figure 6:
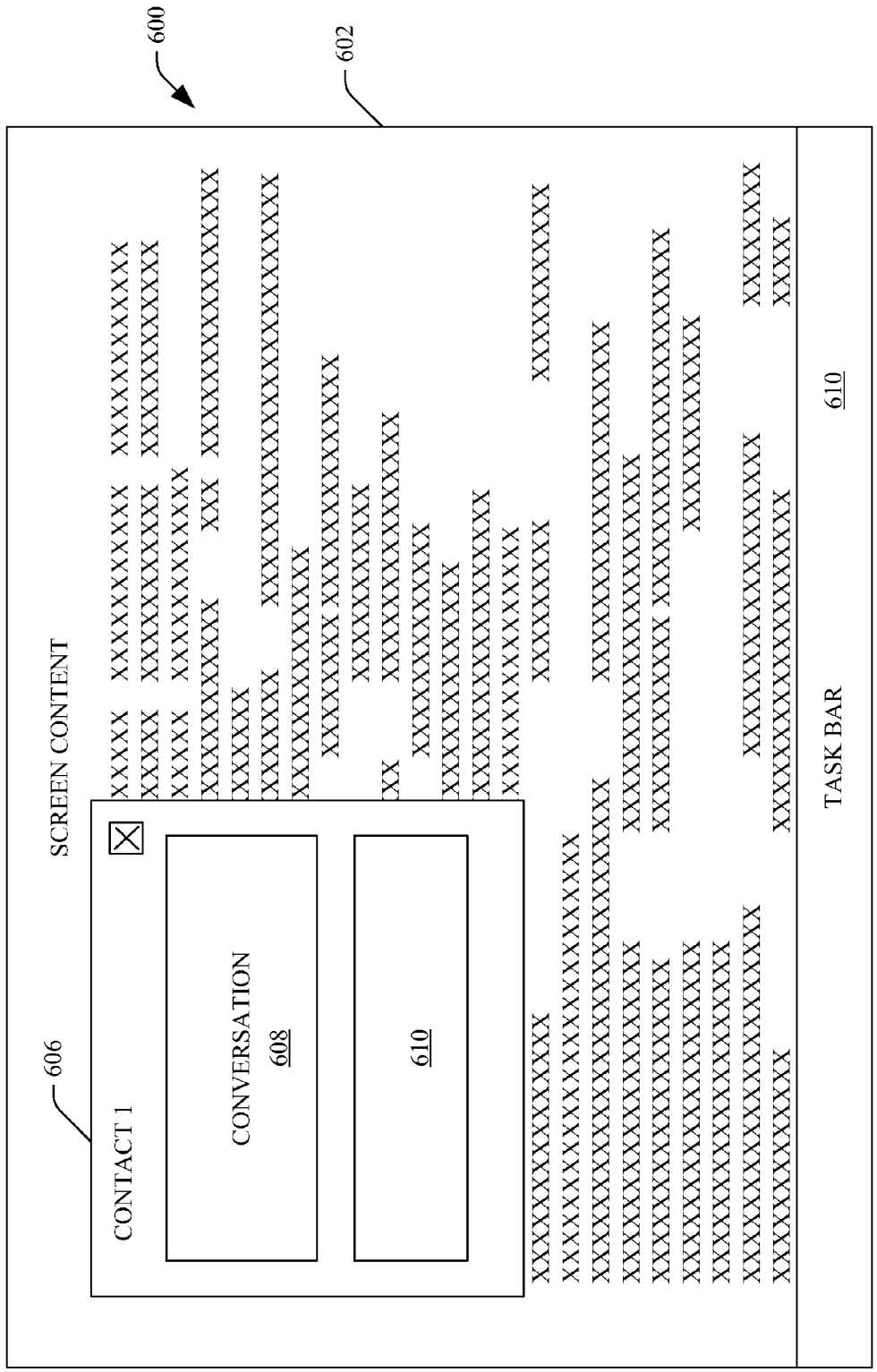
FIG. 6 is an example depiction of a conversation window on a display screen.

Turning now to FIG. 6, an example depiction 600 of a conversation window on a display screen of a computing device is illustrated. As shown, a display 602 can include content that can be reviewed by a user. The display 602 can also include a taskbar 604. In this example, a conversation window 606 is open on the display 602, wherein the conversation window 606 is drawn on top other content. The conversation window 606 can include a first portion 608 that displays messages received by the user and transmitted by the user with respect to a particular contact and a second portion 610 that can receive information (e.g., text, video, . . . ) that is desirably transmitted to the particular contact. Conventionally, content "beneath" the conversation window 606 cannot be viewed by the user unless the user elects to close, minimize, or move the conversation window 606.

Figure 7:
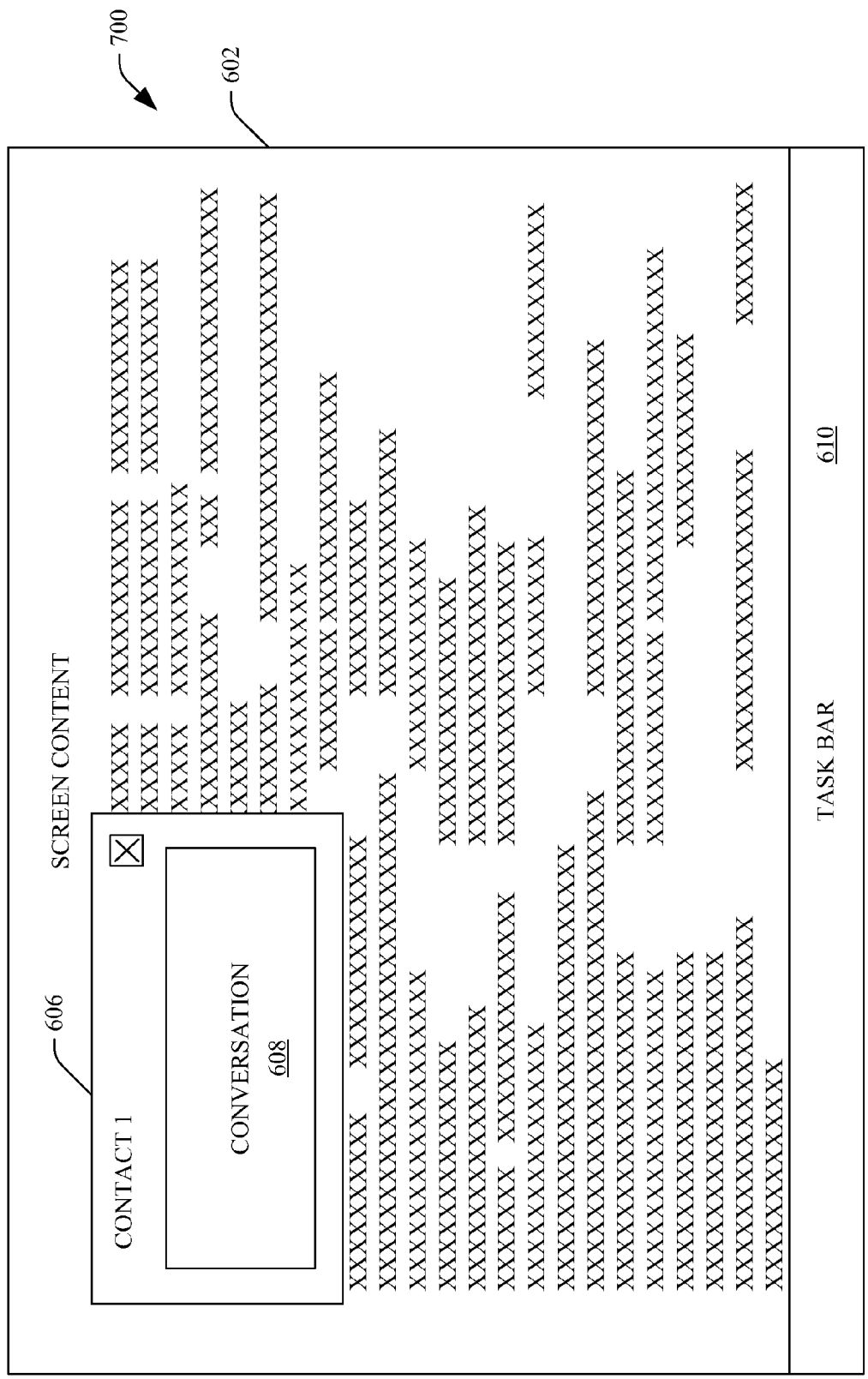
FIG. 7 is an example depiction of a conversation window with an information entry portion visually removed therefrom.

Referring briefly to FIG. 7, another example depiction 700 of the conversation window on the display screen of the computing device is illustrated. In this example, the second portion 610 of the conversation window 606 has been visually removed from the display 602. For example, visual removal of the second portion 610 of the conversation window 606 can be undertaken automatically after passage of a particular period of time that the conversation window 606 has gone unused. In another example, visual removal of the second portion 610 of the conversation window 606 can be undertaken upon receipt of user input that indicates desirability of visually removing the second portion 610 of the conversation window 606 from the display 602. The second portion 610 of the conversation window 606 can be re-presented to the user upon user selection of the conversation window 606, upon the user mousing over the conversation window 606, etc.

Figure 8:
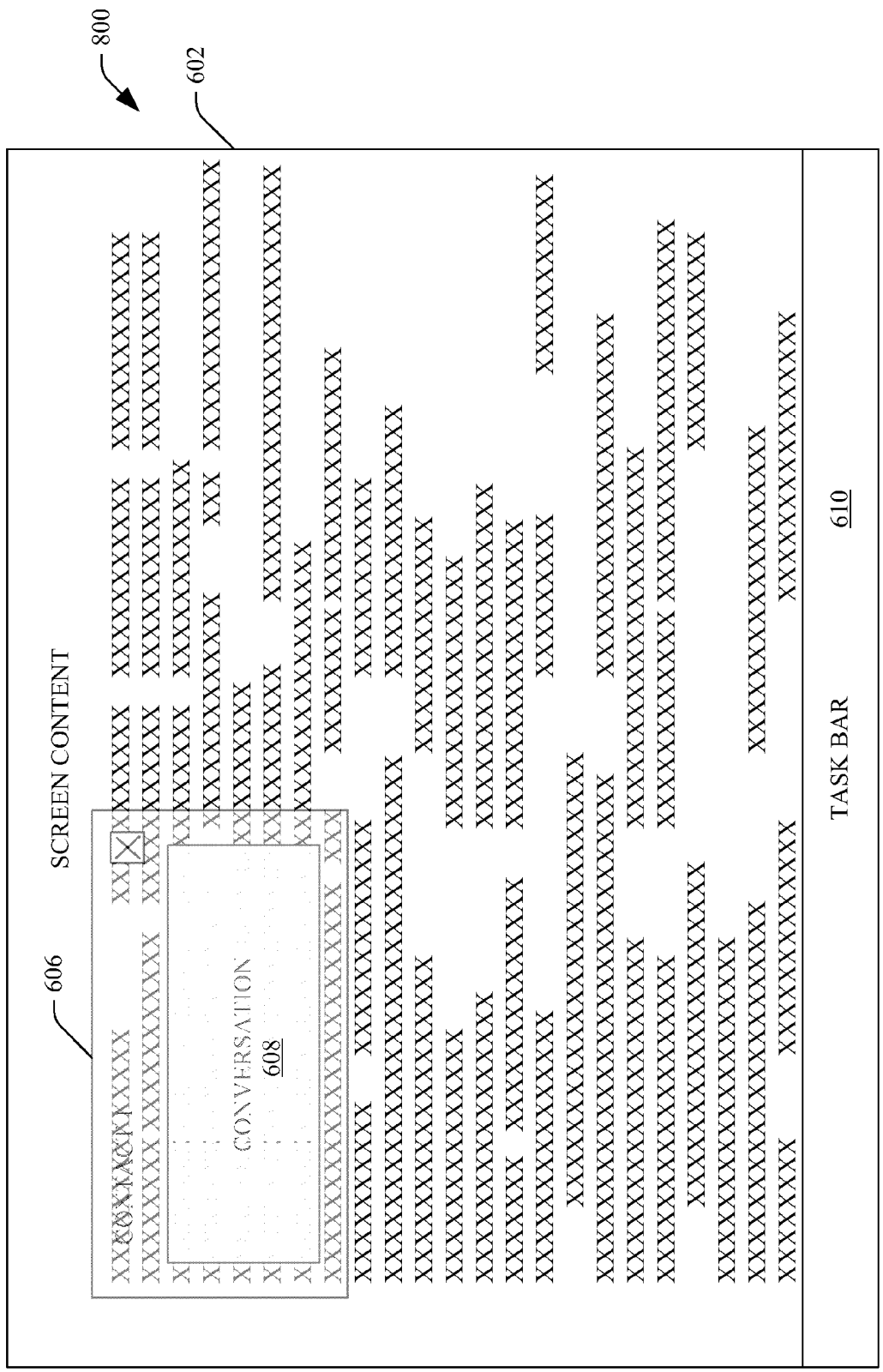
FIG. 8 is an example depiction of a conversation window rendered semi-transparently.

Turning now to FIG. 8, another example depiction 800 of the conversation window on the display screen of the computing device is illustrated. In this example, at least the first portion 608 of the conversation window 606 has been rendered semi-transparently, such that a user can view content in the conversation window 606 as well as visibly perceive content drawn "beneath" the conversation window 606. Rendering the conversation window 606 in a semi-transparent manner can be undertaken upon passage of a particular amount of time where the conversation window 606 has been unused, upon an action by a user, etc. The conversation window 606 can be redrawn in a non-transparent manner if the user selects the conversation window 606, mouses over the conversation window 606, etc.

Figure 9:
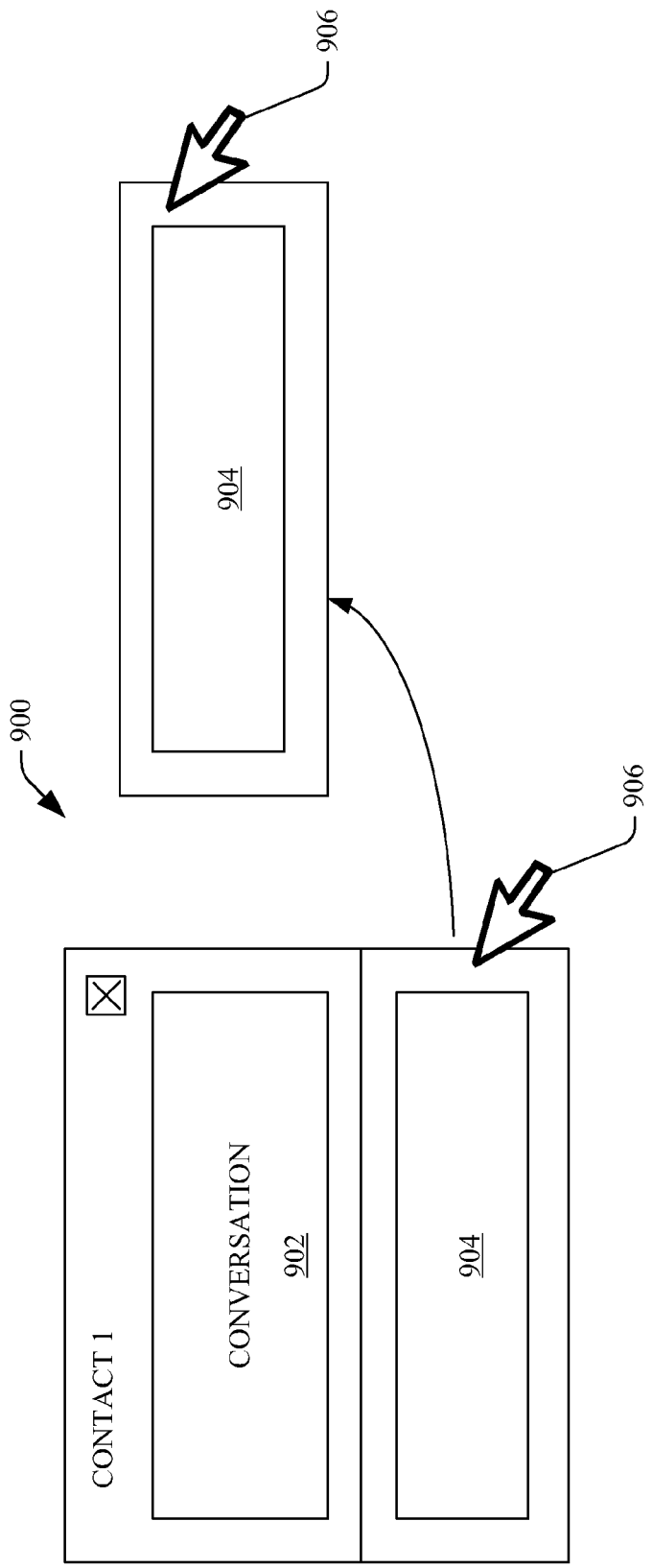
FIG. 9 is an example depiction of an information entry portion of a conversation window being detached from a remainder of the conversation window.

Now referring to FIG. 9, an example conversation window 900 is illustrated. The conversation window 900 includes a first portion 902 that is configured to depict an instant messaging conversation between a user of the conversation window 900 and a contact of the user. The conversation window 900 also includes a second portion 904 that is configured to receive information desirably transmitted by the user to the contact, such as text. In this example, the second portion 904 can be detached from the first portion 902 and moved to a different portion of a display screen. For instance, the user can employ a cursor 906 to select the second portion 904 and detach the second portion from the remainder of the conversation window 902 (e.g., the first portion 902). The user can continue to employ the second portion 904 to communicate with the contact by way of the conversation window 900.

Figure 10:
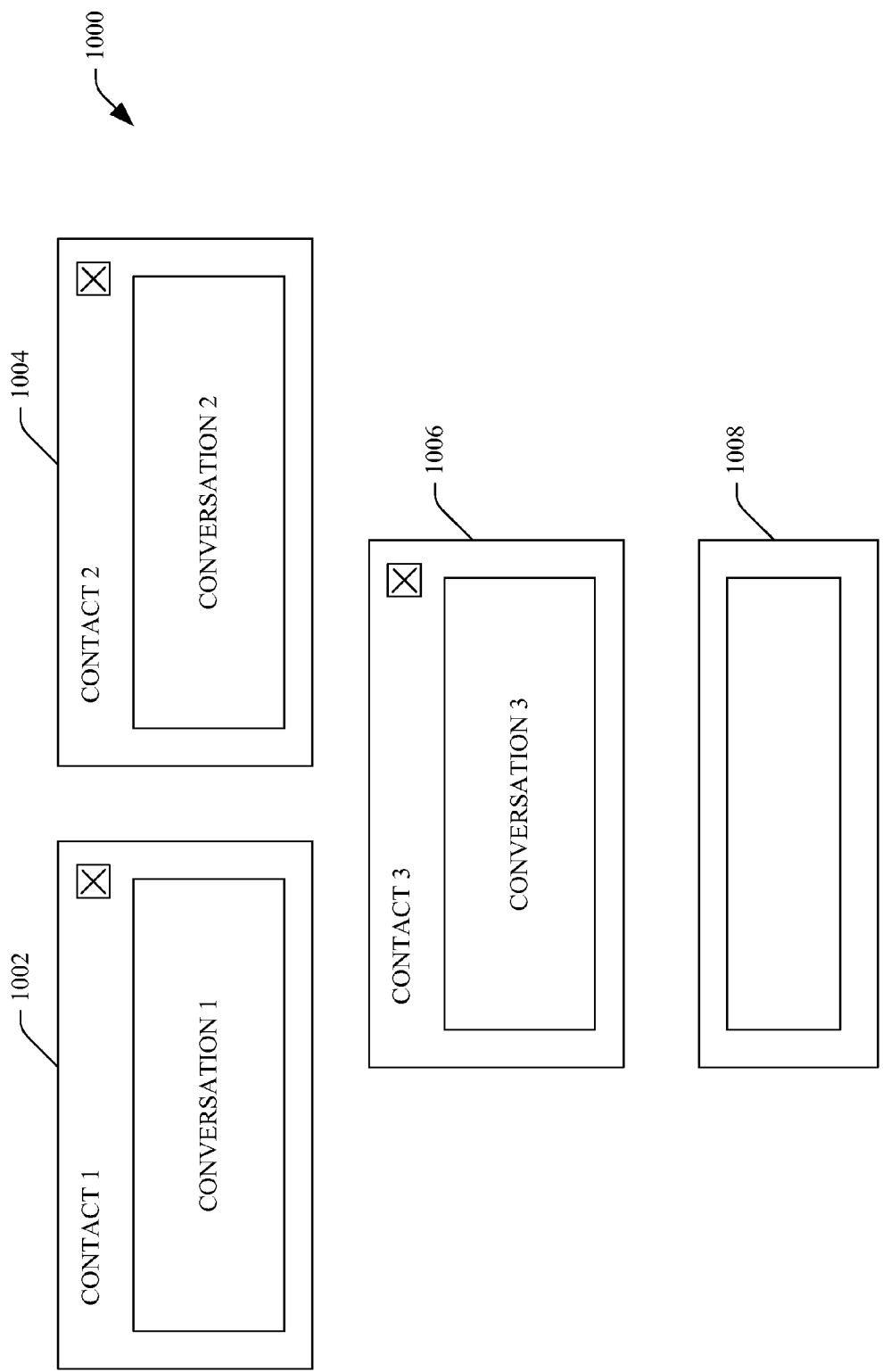
FIG. 10 is an example depiction of a single information entry portion that can be used to communicate with multiple contacts.

Referring now to FIG. 10, an example depiction 1000 of multiple conversations using an instant messaging application is illustrated. Three different portions of conversation windows are illustrated: a first portion 1002, a second portion 1004, and a third portion 1006. The first portion 1002 depicts an instant messaging conversation with a first contact, the second portion 1004 depicts an instant messaging conversation with a second contact, and the third portion 1006 depicts an instant messaging conversation with a third contact. In an example, a single data entry portion 1008 can be used to communicate to with all three contacts. For instance, the data entry portion 1008 may include three buttons (not shown) that correspond to the three different contacts, where messages can be directed based upon a selected button. In another example, voice commands can be used to select a contact and transmit a message to the selected contact.

Figure 11:
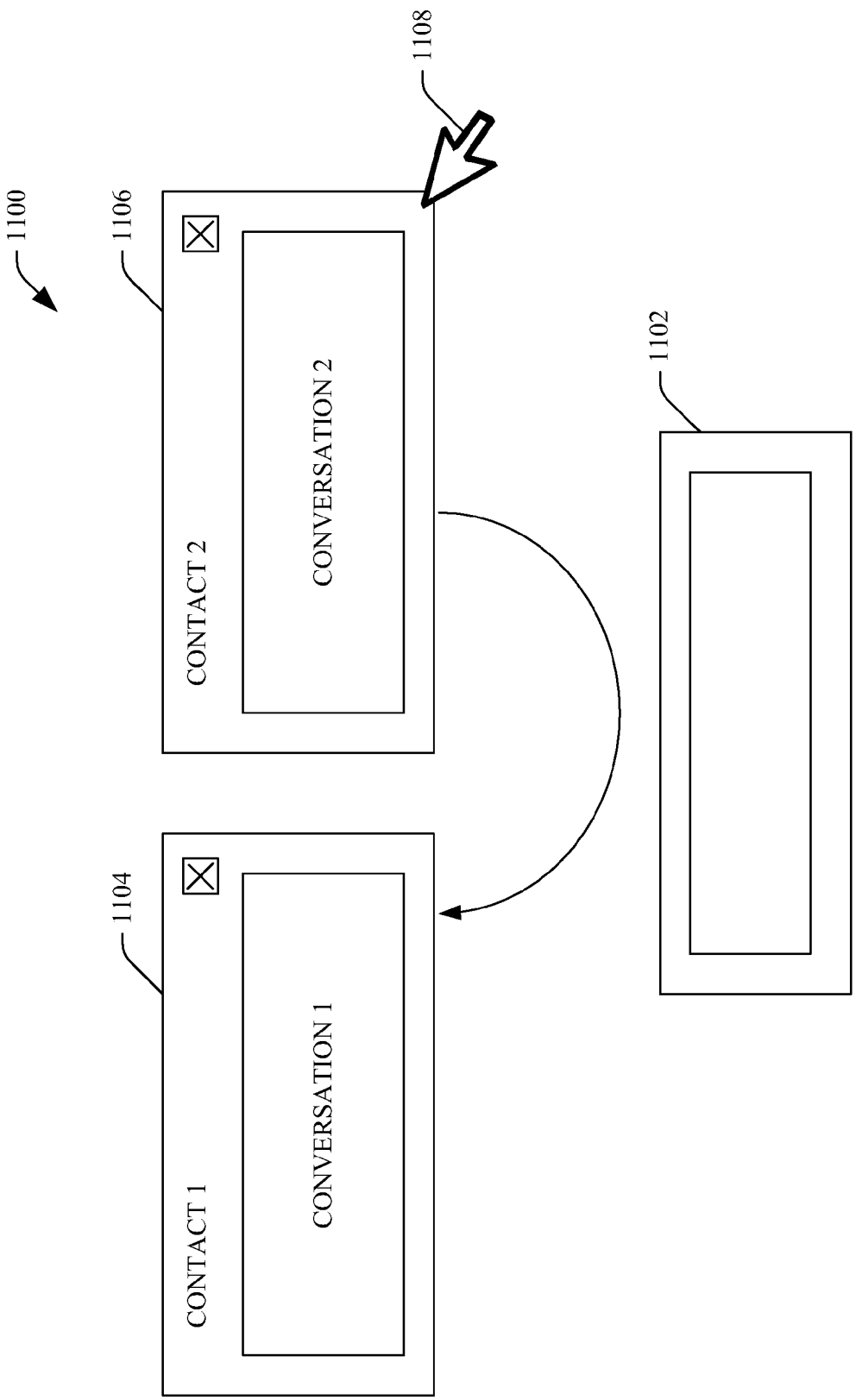
FIG. 11 is an example depiction of a first conversation window being selected and dragged over a second conversation window.

Turning now to FIG. 11, an example depiction 1100 of multiple conversation windows is illustrated. In this example, a single information entry portion 1102 can be used to transmit messages to multiple contacts by way of multiple portions 1104 and 1106 of conversation windows. Furthermore, as shown in this example, the second portion 1106 can be selected through use of a cursor 1108 and dragged over the first portion 1104.

Figure 12:
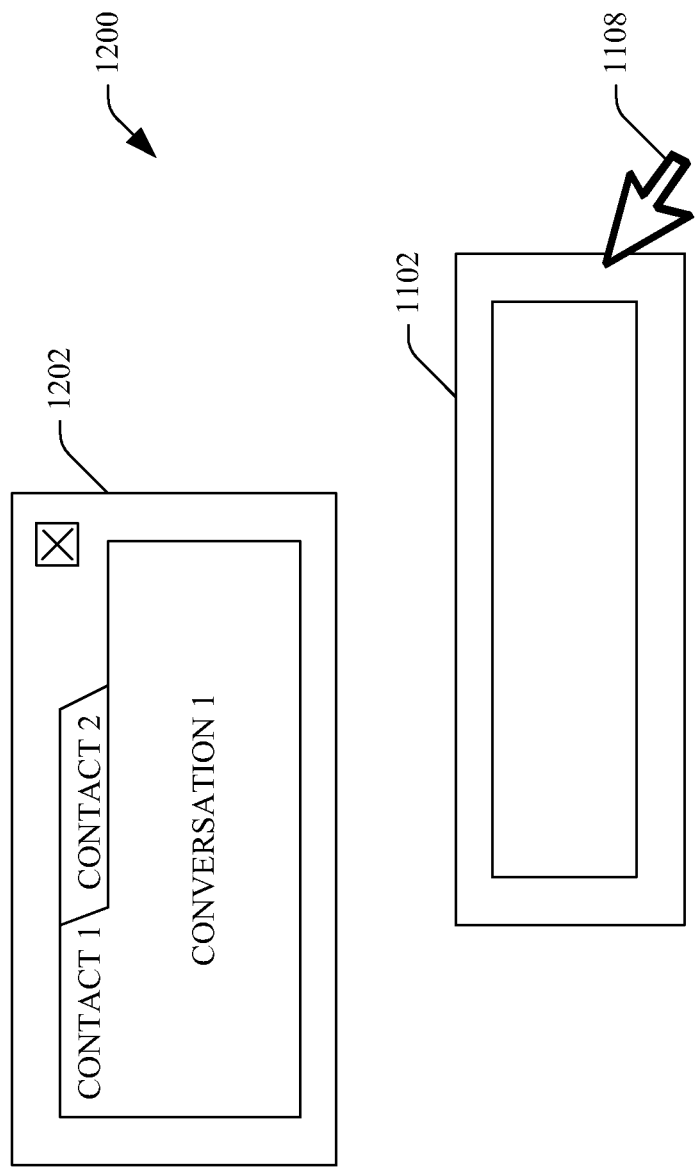
FIG. 12 is an example depiction of tabbed messaging.

Now turning to FIG. 12, an example depiction 1200 of tabbed messaging is illustrated. As shown in FIG. 11, a conversation window or portion thereof can be dragged over another conversation window or portion thereof. A result of such an action may be creation of a conversation window 1202 that can be used in connection with tabbed messaging, wherein the information entry portion 1102 can be used to communicate with multiple contacts in the tabbed conversation window 1202. For instance, selection of a tab for a first contact can cause the information entry portion 1102 to be used in connection with communicating with the first contact, while selection of a tab for a second contact can cause the information entry portion 1102 to be used in connection with communication with the second contact. Additionally, the information entry portion 1102 need not be redrawn upon selection of a different tab.

With reference now to FIGS. 13-17, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 13:
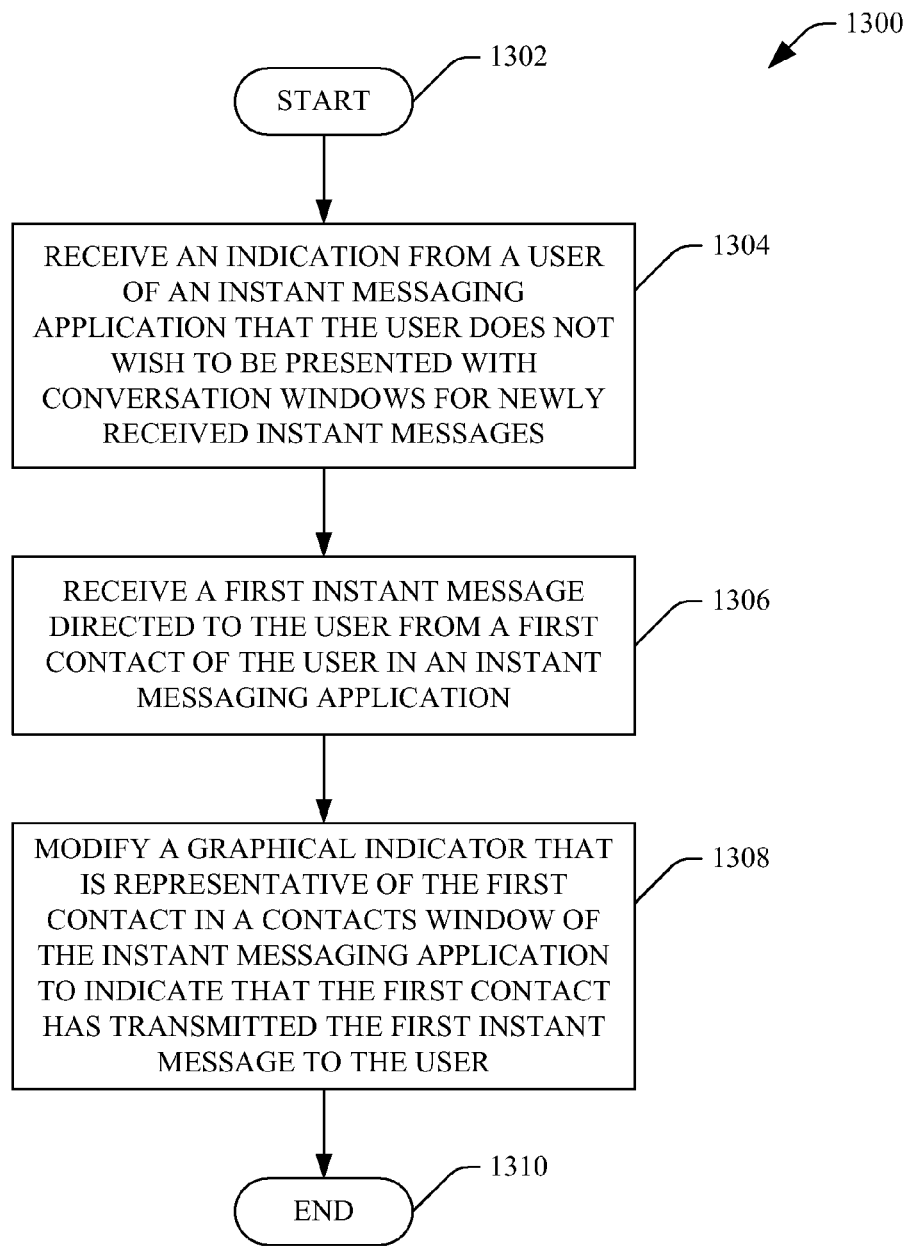
FIG. 13 is a flow diagram that illustrates an example methodology for collapsing a conversation window into a contacts window of an instant messaging application.

Referring now to FIG. 13, an example methodology 1300 that facilitates collapsing an instant messaging conversation window into a contacts window is illustrated. The methodology 1300 starts at 1302, and at 1304 an indication from a user of an instant messaging application is received, wherein the indication indicates that the user does not wish to be presented with conversation windows pertaining to newly received instant messages.

At 1306, a first instant message directed to the user from a first contact of the user in the instant messaging application is received. In an example, the first contact may be an individual or a persistent group. In another example, the instant message may be or include text, audio, video, and/or other suitable data.

At 1308, a graphical indicator that is representative of the first contact in a contacts window of the instant messaging application is modified to indicate that the first contact has transmitted the instant message to the user. The graphical indicator may be an icon, text, a combination thereof, etc. The modification can include changing color of the graphical indicator, causing the graphical indicator to be animated in some way, etc. The methodology 1300 completes at 1310.

Figure 14:
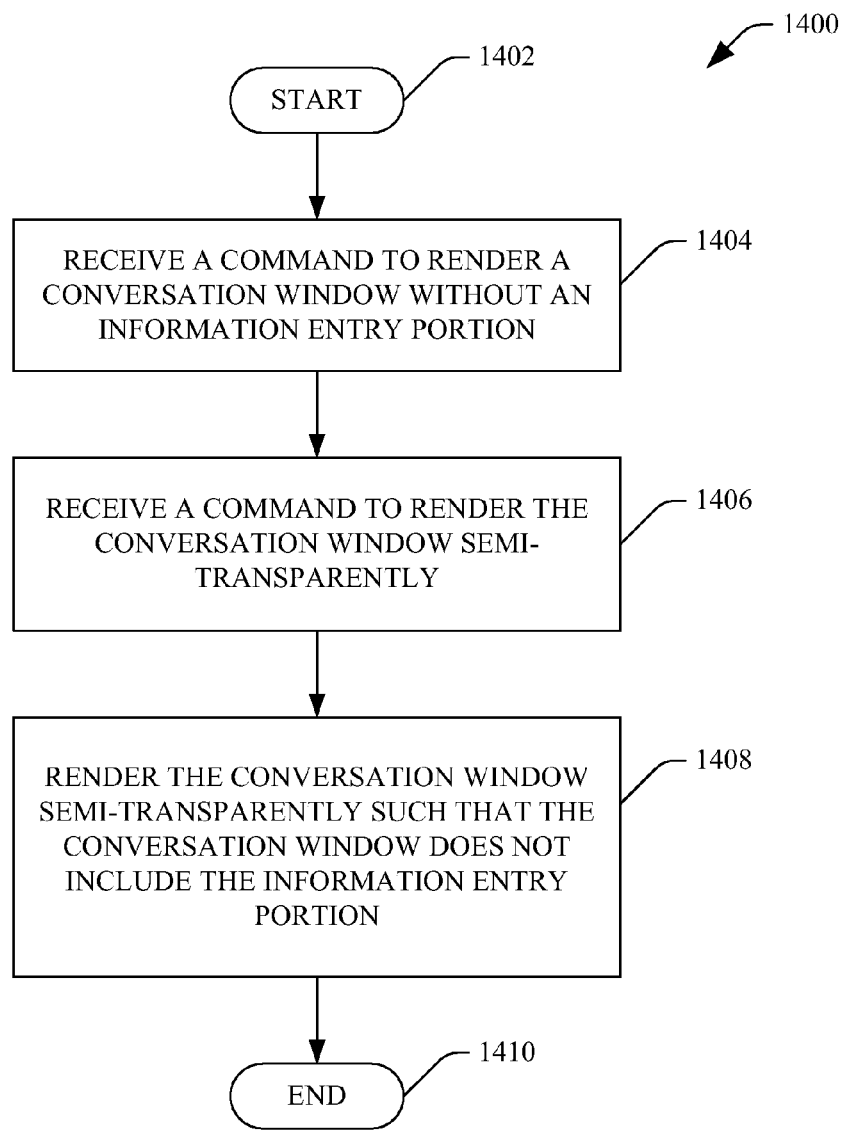
FIG. 14 is a flow diagram that illustrates an example methodology for rendering a conversation window semi-transparently and without an information entry portion.

Referring now to FIG. 14, an example methodology 1400 that facilitates efficiently using screen real-estate is illustrated. The methodology 1400 starts at 1402, and at 1404 a command to render a conversation window without an information entry portion is received. The command can be automatically generated after passage of a predefined amount of time, can be received from a user, etc.

At 1406, a command is received to render the conversation window semi-transparently. Again, the command can be automatically generated after passage of a predefined amount of time, can be received from a user, etc.

At 1408, the conversation window is rendered semi-transparently such that the conversation window does not include an information entry portion. The methodology 1400 completes at 1410.

Figure 15:
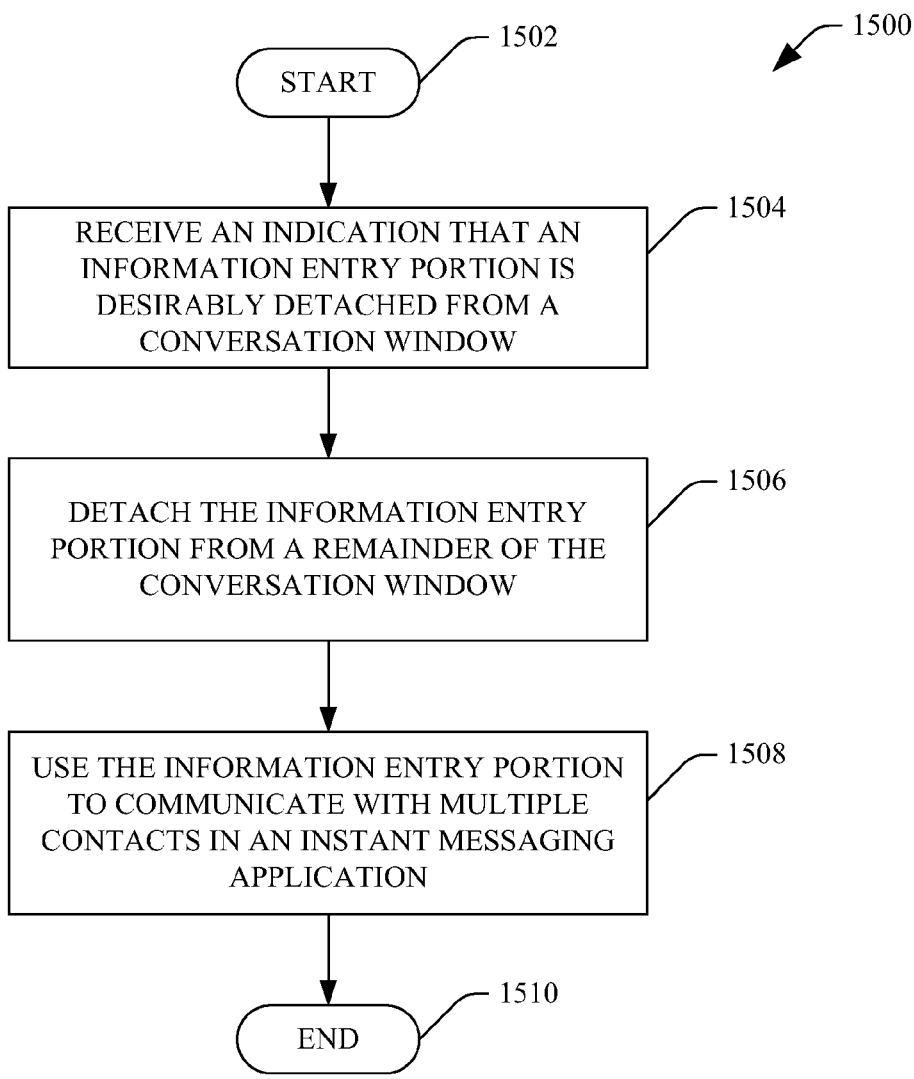
FIG. 15 is a flow diagram that illustrates an example methodology for using an information entry portion to communicate with multiple contacts.

Now turning to FIG. 15, an example methodology 1500 that facilitates using a single information entry portion to communicate with multiple contacts is illustrated. The methodology 1500 starts at 1502, and at 1504 an indication that an information entry portion is desirably detached from a conversation window is received. At 1506, the information entry portion is detached from the remainder of the conversation window. At 1508, the information entry portion is used to communicate with multiple contacts in an instant messaging application. The methodology 1500 then completes at 1510.

Figure 16:
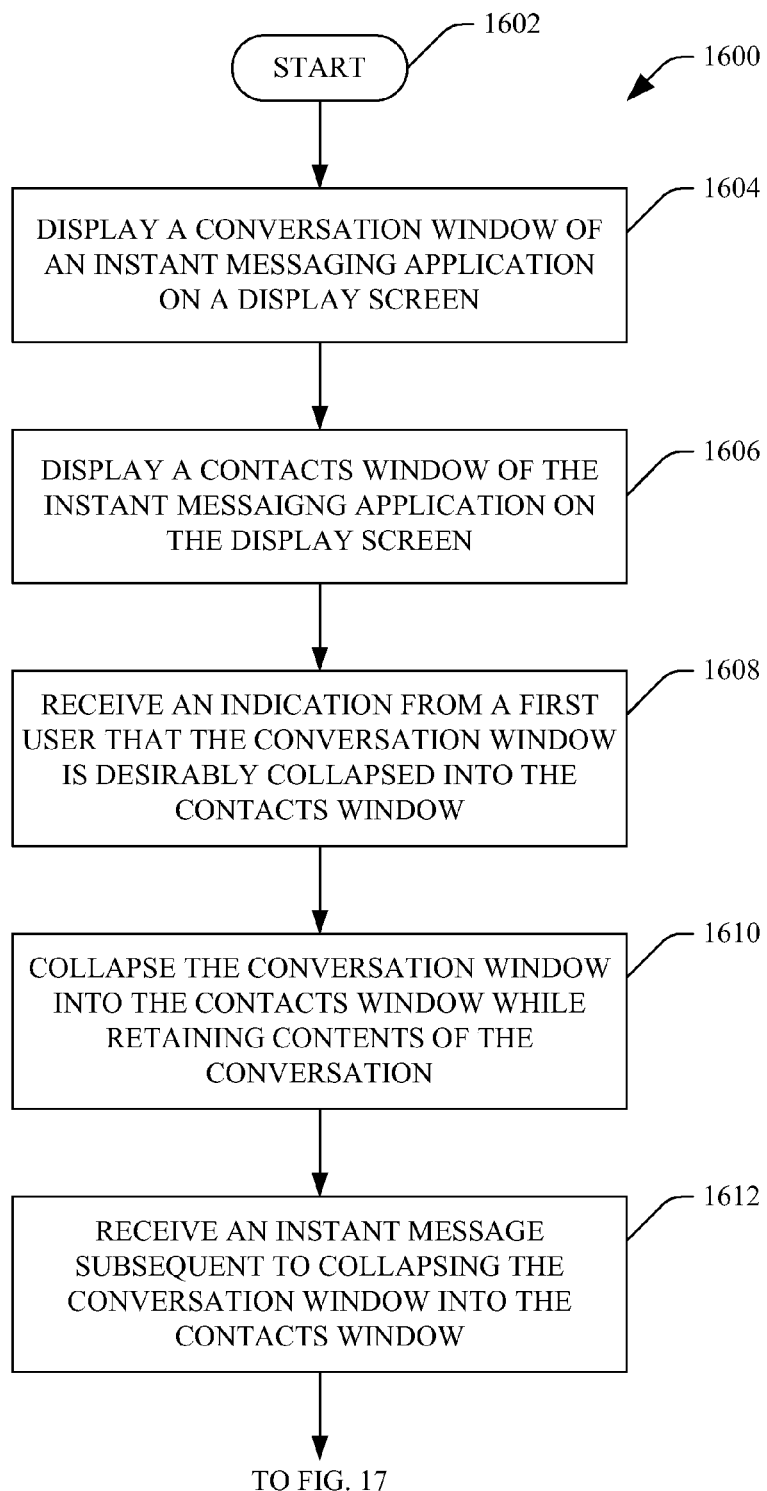
FIGS. 16 and 17 are flow diagrams that illustrate an example methodology for collapsing a conversation window into a contacts window of an instant messaging application.
Figure 17:
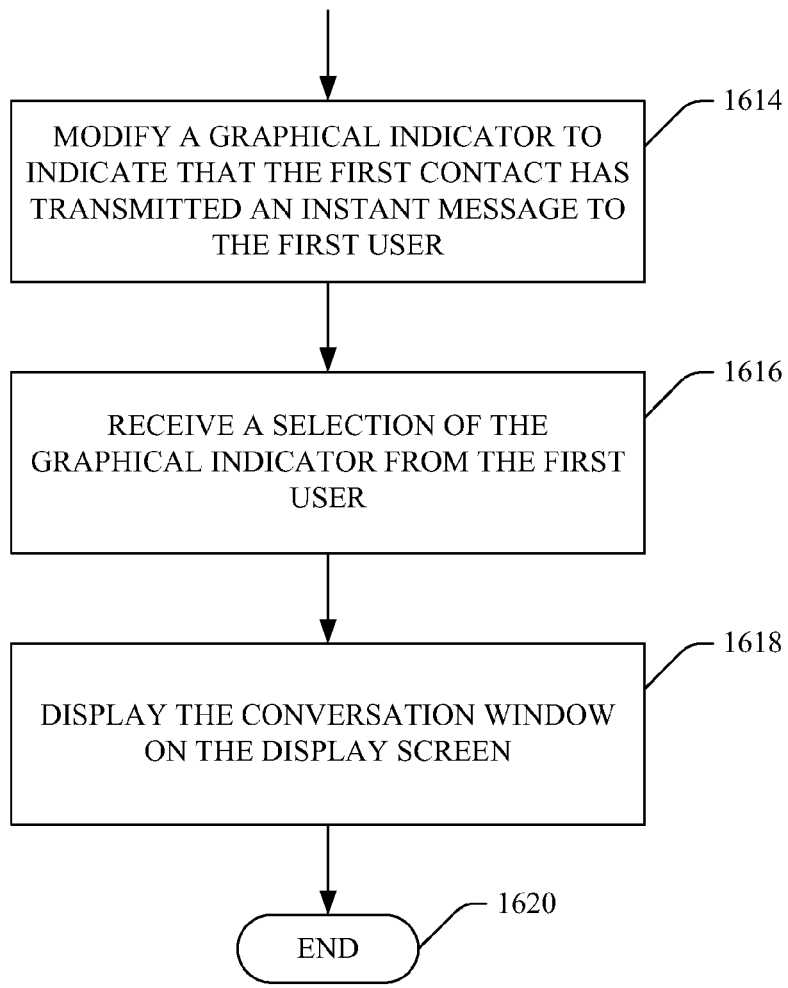

Referring collectively to FIGS. 16 and 17, an example methodology 1600 that facilitates communicating in an instant messaging application is illustrated. The methodology 1600 starts at 1602, and at 1604 a conversation window of an instant messaging application is displayed on a display screen. In an example, the conversation window can illustrate an instant messaging conversation between a first user and a first contact of the first user.

At 1606, a contacts window of the instant messaging application is displayed on the display screen. For instance, the contacts window can include a graphical indicator that is representative of the first contact.

At 1608, an indication is received from the first user that the conversation window is desirably collapsed into the contacts window. At 1610, the conversation window is collapsed into the contacts window while contents of the conversation are retained in the conversation window.

At 1612, an instant message from the first contact is received subsequent to the conversation window being collapsed into the conversation window. At 1614, the graphical indicator is modified to indicate that the first contact has transmitted the instant message to the first user. At 1616, a selection of the graphical indicator is received from the first user.

At 1618, the conversation window is displayed on the display screen, wherein the conversation window includes the received instant message and content existent in the conversation window prior to the conversation window being collapsed into the contacts window. The methodology 1600 completes at 1620.

Figure 18:
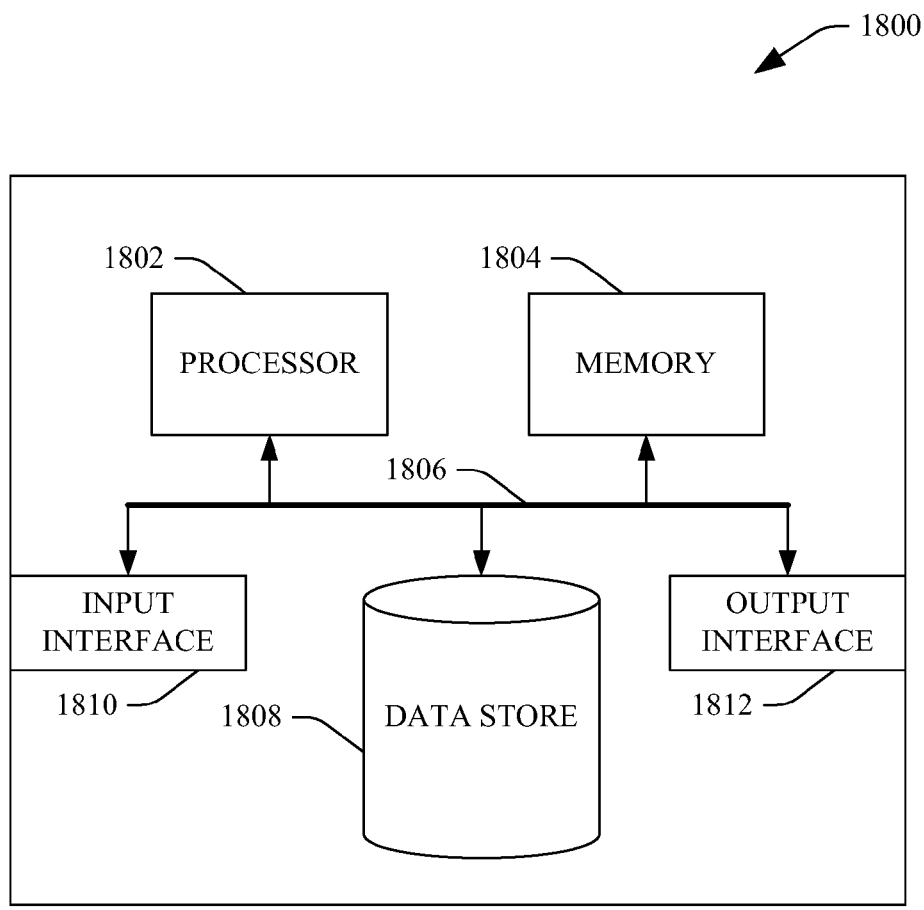
FIG. 18 is an example computing system.

Now referring to FIG. 18, a high-level illustration of an example computing device 1800 that can be used in accordance with the systems and methodologies disclosed herein is illustrated. For instance, the computing device 1800 may be used in a system that can be used to receive and transmit instant messages and/or used to retain data pertaining to instant messaging. In another example, the computing device 1800 may be used in connection with modifying conversation windows in an instant messaging application. The computing device 1800 includes at least one processor 1802 that executes instructions that are stored in a memory 1804. The instructions may be, for instance, instructions for implementing functionality described as being carried out by one or more components discussed above or instructions for implementing one or more of the methods described above. The processor 1802 may access the memory 1804 by way of a system bus 1806. In addition to storing executable instructions, the memory 1804 may also store data pertaining to modifying conversation windows, identities of instant messaging contacts, background schemes to be displayed in conversation windows, etc.

The computing device 1800 additionally includes a data store 1808 that is accessible by the processor 1802 by way of the system bus 1806. The data store 1808 may include executable instructions, data pertaining to instant messaging, etc. The computing device 1800 also includes an input interface 1810 that allows external devices to communicate with the computing device 1800. For instance, the input interface 1810 may be used to receive instructions from an external computer device, receive instant messages to be transmitted, etc. The computing device 1800 also includes an output interface 1812 that interfaces the computing device 1800 with one or more external devices. For example, the computing device 1800 may transmit data to a personal computer by way of the output interface 1812.

Additionally, while illustrated as a single system, it is to be understood that the computing device 1800 may be a distributed system. Thus, for instance, several devices may be in communication by way of a network connection and may collectively perform tasks described as being performed by the computing device 1800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system comprising:
  a processor; and
  a memory that comprises a plurality of components that are executed by the processor, the plurality of components comprising:
  a receiver component that receives an indication that a conversation window of an instant messaging application is desirably collapsed into a contacts window of the instant messaging application, the conversation window and the contacts window displayed on a display screen of a computing device that is executing the instant messaging application, the conversation window facilitating transmittal of messages between a user of the computing device and a first messaging contact of the user, the contacts window comprising a graphical representation of the first contact, wherein the conversation window comprises a conversation that includes at least one message from the user to the first messaging contact; and
  a window minimizer component that collapses the conversation window into the contacts window of the instant messaging application responsive to the receiver component receiving the indication, such that:
  the conversation window is removed from the display screen; and
  the graphical representation of the first contact is highlighted in the contacts window to indicate that the conversation exists with the first messaging contact.

2. The system of claim 1, wherein the first messaging contact is an individual.

3. The system of claim 1, wherein the first messaging contact is a persistent messaging group.

4. The system of claim 1, the plurality of components further comprising an interactor component that receives input from an input device indicating selection of the graphical representation in the contacts window subsequent to the window minimizer component collapsing the conversation window into the contacts window, wherein the interactor component causes the conversation window to be re-presented on the display screen of the computing device, and wherein the conversation window comprises the at least one message when re-presented on the display screen of the computing device.

5. The system of claim 4, wherein the interactor component causes the conversation window to display messages transmitted from the first messaging contact to the user subsequent to the window minimizer component collapsing the conversation window into the contacts window and prior to the conversation window being re-presented on the display screen of the computing device.

6. The system of claim 1, wherein the window minimizer component causes the graphical representation in the contact window to be modified to indicate that a new message has been received from the first messaging contact, wherein the new message is received subsequent to the window minimizer component collapsing the conversation window into the contacts window.

7. The system of claim 1, wherein the computing device is one of a personal computer, a laptop computer, a personal digital assistant, or a smart phone.

8. The system of claim 1, the plurality of components further comprising a background suppressor component that, upon at least one of receipt of a user command or after a predetermined amount of time, causes a text entry field of the conversation window to be visually removed from the conversation window.

9. The system of claim 8, wherein the background suppressor component additionally causes at least a portion of the conversation window to become at least semi-transparent.

10. The system of claim 9, the plurality of components further comprising an interactor component that determines that the user has at least one of moused over or selected the conversation window subsequent to the conversation window becoming at least semi-transparent, and upon determining that the user has at least one of moused over or selected the conversation window, returns the text entry field to the conversation window and returns the conversation window to a non-transparent state.

11. The system of claim 1, wherein the receiver component receives an indication that a text entry field of the conversation window is desirably detached from a remainder of the conversation window, and the plurality of components further comprising a detacher component that detaches the text entry field from the remainder of the conversation window.

12. The system of claim 11, wherein the detacher component causes the text entry field to be usable in conversations with multiple contacts.

13. The system of claim 12, the plurality of components further comprising an interactor component that receives a second indication that the conversation window is desirably combined with a second conversation window, wherein the detached text entry field is usable in connection with the conversation window and the second conversation window.

14. A method comprising the following computer-executable acts:
  displaying a conversation window of an instant messaging application on a display screen of a computing device, wherein the conversation window illustrates an instant messaging conversation between a first user of the computing device and a first contact of the first user, the instant messaging conversation comprising at least one message transmitted from the first user to the first contact;
  displaying a contacts window of the instant messaging application on the display screen, wherein the contacts window includes a graphical indicator that is representative of the first contact;
  receiving a request from the first user to collapse the conversation window into the contacts window;

responsive to receiving the request from the first user, collapsing the conversation window into the contacts window by removing the conversation window from the display screen and highlighting the graphical indicator that is representative of the first contact to indicate to the first user that the instant messaging conversation exists between the first user and the first contact;

subsequent to collapsing the conversation window into the contacts window, receiving a first instant message directed to the first user from the first contact of the user in the instant messaging application; and modifying the graphical indicator that is representative of the first contact in the contacts window of the instant messaging application to indicate that the first contact has transmitted the first instant message to the first user.

15. The method of claim 14, further comprising:

subsequent to collapsing the conversation window into the contacts window, receiving a selection of the graphical indicator in the contacts window from the first user; and graphically re-presenting the conversation window to the first user, wherein the conversation window includes the first instant message.

16. The method of claim 14, wherein the first instant message is from a persistent messaging group.

17. The method of claim 14, further comprising:

receiving a plurality of instant messages from a plurality of contacts; and modifying a plurality of graphical indicators that are representative of the plurality of contacts in the contacts window to indicate that the plurality of instant messages have been received.

18. The method of claim 14, further comprising:

subsequent to collapsing the conversation window into the contacts window, receiving a selection of the graphical indicator in the contacts window from the first user; and graphically re-presenting the conversation window to the first user, wherein the conversation window includes the instant messaging conversation between the first user and the first contact of the first user.

19. The method of claim 14, further comprising:

prior to receiving the indication from the first user that the conversation window is desirably collapsed into the contacts window, causing at least a portion of the conversation window to appear as being semi-transparent on the display screen.

20. A computer-readable memory comprising instructions that, when executed by a computer, cause the computer to perform acts comprising:

displaying a conversation window of an instant messaging application on a display screen, wherein the conversation window illustrates an instant messaging conversation between a first user and a first contact of the first user, the instant messaging conversation comprising a message from the first user to the first contact;

displaying a contacts window of the instant messaging application on the display screen, wherein the contacts window includes a graphical indicator that is representative of the first contact;

receiving an indication from the first user that the conversation window is desirably collapsed into the contacts window;

collapsing the conversation window into the contacts window while retaining contents of the conversation, wherein collapsing the conversation window into the contacts window comprises;

removing the conversation window from the display screen; and highlighting the graphical indicator that is representative of the first contact to graphically indicate to the first user that the instant messaging conversation exists between the first user and the first contact of the first user;

receiving an instant message from the first contact subsequent to collapsing the conversation window into the conversation window;

modifying the graphical indicator to indicate that the first contact has transmitted the instant message to the first user;

receiving a selection of the graphical indicator from the first user; and displaying the conversation window on the display screen responsive to receiving the selection of the graphical indicator from the first user, wherein the conversation window includes the received instant message and content existent in the conversation window prior to the collapsing of the conversation window into the contacts window.

* * * * *